April 7, 1931.  E. BURKE ET AL  1,799,672
MULTIPLE CONDUIT
Filed Oct. 7, 1926   2 Sheets-Sheet 1
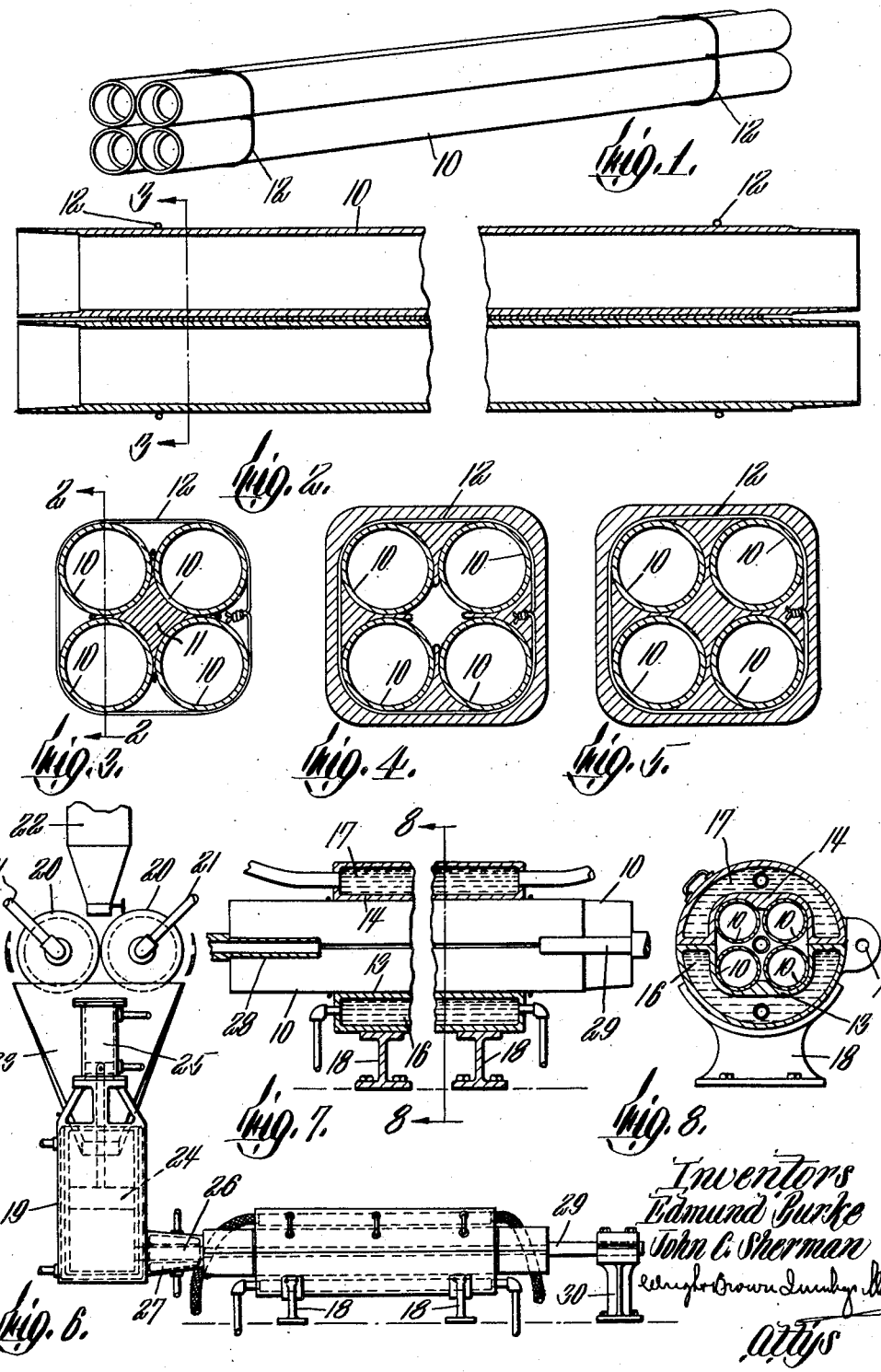

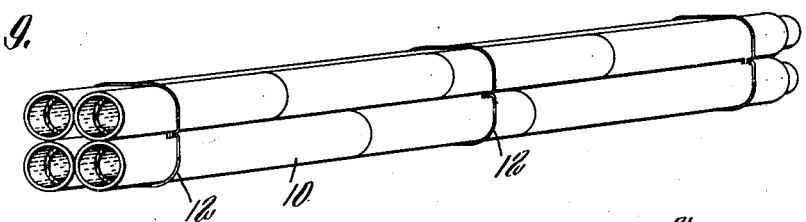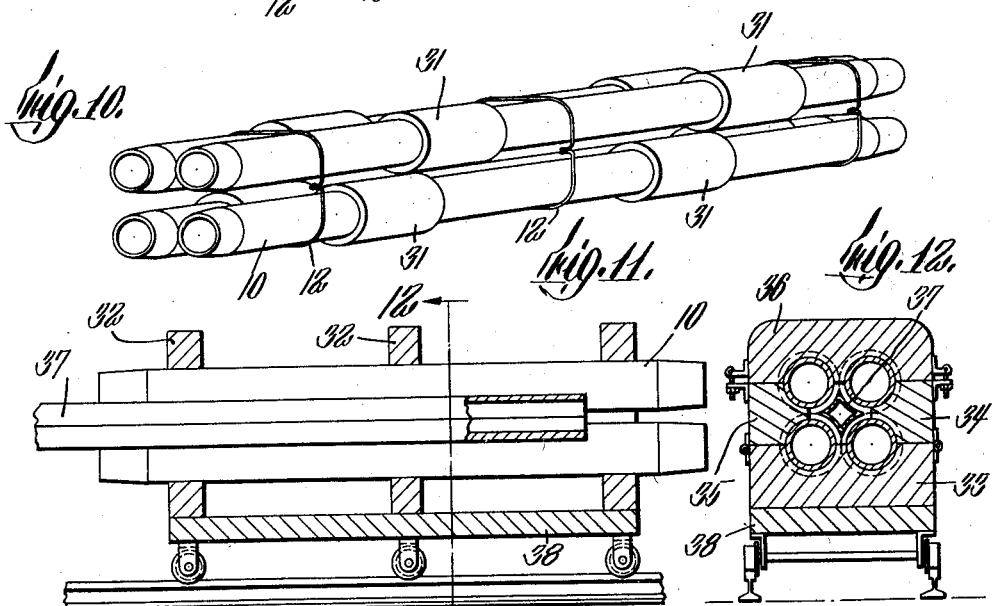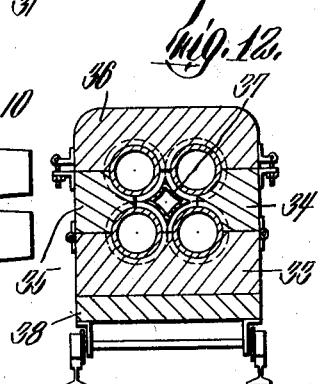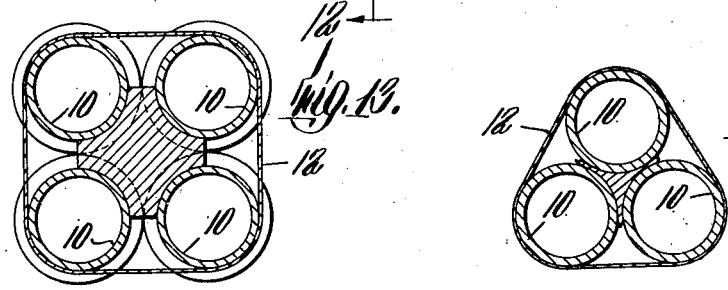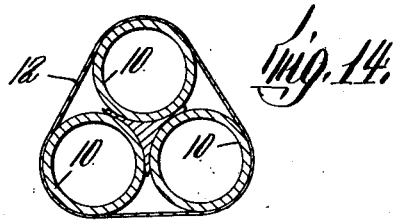

Patented Apr. 7, 1931

1,799,672

UNITED STATES PATENT OFFICE

EDMUND BURKE, OF PORTLAND, AND JOHN C. SHERMAN, OF GORHAM, MAINE, ASSIGNORS TO BROWN COMPANY, OF BERLIN, NEW HAMPSHIRE, A CORPORATION OF MAINE

MULTIPLE CONDUIT

Application filed October 7, 1926. Serial No. 139,975.

This invention relates to built-up units of multiple conduit and methods for producing the same. In the laying of underground or enclosed wires for telephones, power transmission or otherwise, the wires are frequently led through a number of parallel conduits of moderate size, it being usually of advantage to segregate different wires or groups of wires. Consequently there are many installations calling for a series of parallel conduits. Where an installation of this kind is desired, it has been the practice to use tile conduit having multiple passages, or more recently where it is desired to use waterproofed fibrous conduit, sections of single conduit have been built up in the process of laying, suitable blocks being used to space the parallel conduits evenly. The fibrous type of conduit has many advantages over the vitreous type, among them being lightness, cheapness, strength and toughness. Furthermore, the material can be machined so that the ends can be easily shaped to make tight joints. Especially suited for uses of this kind is conduit made by extruding a heated plastic mass of fiber thoroughly mixed with a suitable waterproofing binder and formed into tubular shape as described in an application of John C. Sherman, Serial No. 127,260, filed August 5, 1926. Another suitable kind of conduit for the purpose is that which is made by rolling up a sheet of wet pulp under pressure into tubes having walls of homogeneous consistency, drying the tubes, and impregnating them with waterproofing material. But we do not limit ourselves to any particular kind of conduit. Where an installation calls for several parallel conduits, however, the cost of laying has been unnecessarily large. By our invention, we provide made-up sections of multiple conduit. Such sections can be made up of any desired number of single conduits within reasonable limits, and their use greatly facilitates the laying of multiple lines of conduit. They are easily handled, easily alined, and the ends of the individual conduits in the multiple sections may (and preferably do) have machined ends to interfit with corresponding ends of other sections and to form watertight joints.

The sections of multiple conduit may be made up in a variety of ways. In general, we prefer to use spacing material between the individual conduit sections, the individual sections being held against the spacing material by adhesion, by encircling straps or tie members, or by both.

Further advantageous features of construction will appear from the description of our invention which follows and from the drawing, of which—

Figure 1 represents a section of multiple conduit illustrating one embodiment of our invention.

Figure 2 is a longitudinal section of the multiple conduit illustrated in Figure 1, the section being taken on the line 2—2 of Figure 3.

Figure 3 is a transverse section taken on the line 3—3 of Figure 2.

Figures 4 and 5 are transverse sections of modified forms of our invention.

Figure 6 is an elevation of apparatus for carrying out one form of our invention.

Figure 7 is a fragmentary view partly in section of a portion of the apparatus illustrated in Figure 6.

Figure 8 is a transverse section on the line 8—8 of Figure 7.

Figure 9 is a perspective of a section of multiple conduit made up of odd lengths of single conduit.

Figure 10 is similar to Figure 9 except that the odd lengths are connected by a different type of joint.

Figure 11 shows a modified form of a part of the apparatus illustrated in Figure 6.

Figure 12 is a section on the line 12—12 of Figure 11.

Figures 13 and 14 show further modified forms of multiple conduit.

Referring to the drawings in detail, 10 represents lengths of single conduit, preferably of waterproofed fibrous material, such conduit being particularly desirable and suitable for many kinds of service for which vitreous conduit is not so well adapted. These lengths of fibrous tubing or conduit may be grouped about a core 11 and preferably adhere thereto, the adhesion being a result of the use of a film of adhesive material between the core and each individual conduit 10 or a partial fusion or intermingling of the surfaces of the core and the contiguous surfaces of the individual conduit sections. Where the individual conduits are made to adhere to the core, exterior bonds or tie members are not required, but we prefer to use such members to strengthen the assembly, such tie members consisting preferably of wires or strands 12 of any desired material. Instead of wires, bands or straps may be used. If these tie members are of metal, they may be secured by twisting the ends as illustrated in the figures or by spot welding, clamping, or any other desired method.

In Figures 6, 7 and 8 is illustrated apparatus for carrying out our invention and forming the sections of multiple conduit. In assembling the individual lengths, we may use a hollow jig which as indicated in Figure 8 may comprise a lower portion 13 and an upper portion 14, these portions being shaped to cooperate and being preferably hinged as at 15. In order to control the temperature of the thermoplastic elements which preferably constitute a part of the material used in assembling our multiple conduit sections, we provide water jackets 16, 17 surrounding the members 13, 14. The jig may be supported by suitable standards 18. As illustrated on the drawing, the jig is capable of holding four individual conduits, but it is within the scope of the invention to construct jigs holding other numbers of conduit to be assembled into a multiple conduit section. In using the apparatus indicated in Figures 7 and 8, two sections of individual conduit may be laid in the member 13, the latter being suitably shaped to receive conduit of the desired size. Core material, such as cement or any other suitable plastic compound, may then be troweled along the space between the two conduit sections, after which two more conduits may be laid on top and the jig closed to space the individual conduits correctly to allow the plastic core to solidify under proper temperature regulation. The core material should preferably be comparatively light so as not to offset the advantages of lightness inherent in fibrous conduit. A cementitious material may be made of Portland cement and cinders, the resulting mixture being a comparatively light concrete. Or fibrous mill scrap, sawdust, or the like, may be ground and mixed with a suitable binder into a plastic mass. Various binders may be used, such for example as asphalt, wax tailings or other heat responsive substance, or soluble substance like water glass may be used as a binder, the mass setting as a result of the drying out of the solvent. Instead of troweling in the core material by hand, we may extrude such material by pressure means from a suitable receptacle 19. In Figure 6 is indicated a pair of grinding rolls 20 which are preferably heated as by steam pipes 21. Through a suitable hopper 22, cellulosic or asbestos fiber or any suitable mixture of these or other fibers, are deposited upon the peripheries of the revolving cylinders 20, sufficient adhesive binding material being also added to cause the fibrous mass to stick to the surface of the rolls. The fibers and binding material are thoroughly ground and mixed upon the rolls, additional binding material being added from time to time until the mixture is of suitable consistency whereupon it may be scraped off and allowed to drop through a hopper 23 into the chamber 19 which is preferably steam jacketed so as to maintain the plastic mixture at a proper temperature for extrusion. Pressure may be applied to the mass by any suitable means such as a piston 24 operated by a hydraulic press 25 or otherwise. The plastic mass under the pressure exerted upon it by the piston 24 is made to pass through a duct 26 which is also jacketed as at 27 for temperature control. The duct 26 preferably terminates in a suitable nozzle 28 which is shaped to fit closely into the space between the four conduits in the jig when located in their proper positions therein. A suitable plug 29 projects into the core space from the opposite end and is supported by any suitable standard 30. When a set of conduits have been assembled in the jig, pressure may be applied to the piston 24 forcing the plastic mass in the container 19 through the duct 26 and the nozzle 28 and filling the core space between the assembled conduits in the jig. If the conduits themselves are made of substance containing a thermoplastic binder, it may be preferable to heat the surfaces of the conduits adjacent to the core space immediately prior to the introduction of the core material. This core material also having a thermoplastic ingredient will thus unite more completely and firmly with the material of the conduits themselves. The core material preferably is not extended to the ends of the assembly but a space of a foot or so is left between the end of the core filling and the end of the conduit. This permits the conduit ends to be sprung slightly if necessary to register with the corresponding ends of the next section in line. The practical need for this provision lies in the fact that in jigging up the single conduit sections, slight variations in wall thickness will affect the relative spacing of the conduits so that the mutual alinement of corresponding conduits in successive sections of multiple conduit cannot always be depended upon to be exact. Tie members 12 may be secured around the assembly of conduits either before or after removal from the jig. These tie members are not essential, but add greatly to the strength of the assembly without materially adding to the weight thereof.

Each section, after removal from the jig, is preferably dipped in or painted over with a waterproofing compound such as hot Gilsonite. The jig as illustrated in Figure 8 is particularly suited for the production of the form of multiple conduit sections illustrated in Figure 3. The members 13 and 14, however, may be suitably shaped to permit the introduction of plastic material around the conduits as shown in Figure 4 or both around and between them as shown in Figure 5. Such forms, however, require considerably more material than that shown in Figure 3.

In Figures 9 and 10 are illustrated forms of multiple conduit sections somewhat similar to that shown in Figure 1 except that instead of being built up of single full lengths of conduit, a number of short odd lengths are pieced together. In this way, the odd lengths of tubing which result from the cutting out of defective portions of tubing made in the mill can be utilized to advantage. In assembling such short lengths, it is preferable to stagger the joints as shown. If it is desired to assemble the conduits close together as shown in Figure 9, it is preferable to use joints such as are illustrated at the ends of the conduit shown in Figure 2. These leave a flush exterior surface on each conduit and may be made strong and watertight by the use of suitable adhesives. In Figure 10 the short sections are shown as united by couplings 31 into which the ends of the short sections may be screw threaded or otherwise fitted. The use of such couplings necessitates the spacing of the individual conduits a little farther apart than is necessary in the form shown in Figure 9. The lightness and toughness of fiber tubing and the ease with which strong tight joints may be made permit the construction and use of multiple conduit sections of lengths considerably greater than has heretofore been considered practicable. In laying a multiple conduit installation, it can readily be seen that the longer the individual sections, the easier it will be to aline successive sections, and the fewer joints there will be to be made tight. This means a great saving in labor and the expense of laying.

Figures 11 and 12 illustrate a modified form of apparatus for inserting the core material between an assembled set of single conduit. This apparatus may comprise a series of members 32 which as shown in Figure 12 may include a base portion 33, side portions 34, 35, and a top portion 36. These are preferably so shaped and related as to receive and hold the desired number of individual conduits in proper spaced relation. As shown in Figure 12, the side members 34, 35 are for convenience hinged to the base member 33, the top member 36 being attachable as by bolts or clamps to the members 34, 35. As shown the recesses in these members are formed to hold the conduits in sufficiently spaced relation to permit the presence of couplings 31. In Figure 11 an extruding nozzle 37 is shown projecting most of the way through the conduit assembly. In this form of apparatus as the plastic core material is extruded from the nozzle 37, the jigs 32 which are carried on a suitable car 38 are moved away from the nozzle as rapidly as the core space fills up, the action being somewhat similar to that of a sausage machine. The nozzle 37 is preferably shaped to fit as closely as possible in the core space so that the extruded material will have to be deformed as little as possible after extrusion in order to fit into and fill the core space between the single conduit. Tie members 12 may be secured about the assembly at any stage of the process, either before or after extrusion of the core material. The extruded material is designed to fill up the core space somewhat in the manner indicated in Figure 13. In Figure 14 is illustrated an assembly of three conduits which may be formed in a suitable jig by any of the methods described above.

Having thus described an embodiment of our invention, it should be evident to those skilled in the art that many changes and modifications may be made therein without departing from its spirit or scope as defined by the appended claims.

We claim:—

1. The method of making sections of multiple conduit, which comprises assembling a plurality of sections of single conduit in substantially parallel relation, extruding plastic material into the space between said conduits sufficient to fill said space for a portion only of the length of the conduits, and allowing the plastic material to set.

2. The method of making sections of multiple conduit, which comprises assembling a plurality of sections of single conduit in substantially parallel relation, extruding plastic material into the space between said conduits sufficient to fill said space for a portion only of the length of the conduits, securing tie members around the assembled conduits, and allowing the plastic material to set.

3. The method of making sections of multiple conduit, which comprises assembling a plurality of sections of waterproofed fibrous conduit in substantially parallel relation, heating the opposed surfaces of the conduits, and filling the space between the conduits with a mass of thermoplastic material extending a portion only of the length of the conduits.

4. The method of making sections of multiple conduit, which comprises holding a plurality of sections of single conduit in parallel spaced relation, filling the space between said conduits with adhesive material in plastic condition for a portion only of the length of the conduits, allowing the plastic filler to set, and removing the assembled conduits from the holding means.

5. The method of making sections of multiple conduit, which comprises holding a plurality of sections of single conduit in predetermined spaced relation, inserting an extrusion orifice into the space between the conduits, extruding plastic material through said orifice into said space, and causing relative longitudinal motion between the assembled conduits and said orifice as said space is filled up by the extruded plastic material.

In testimony whereof, we have affixed our signatures.

EDMUND BURKE.
JOHN C. SHERMAN.